July 21, 1925. 1,546,554
J. W. ROSS
SCREW PROPELLER
Filed Sept. 16, 1922
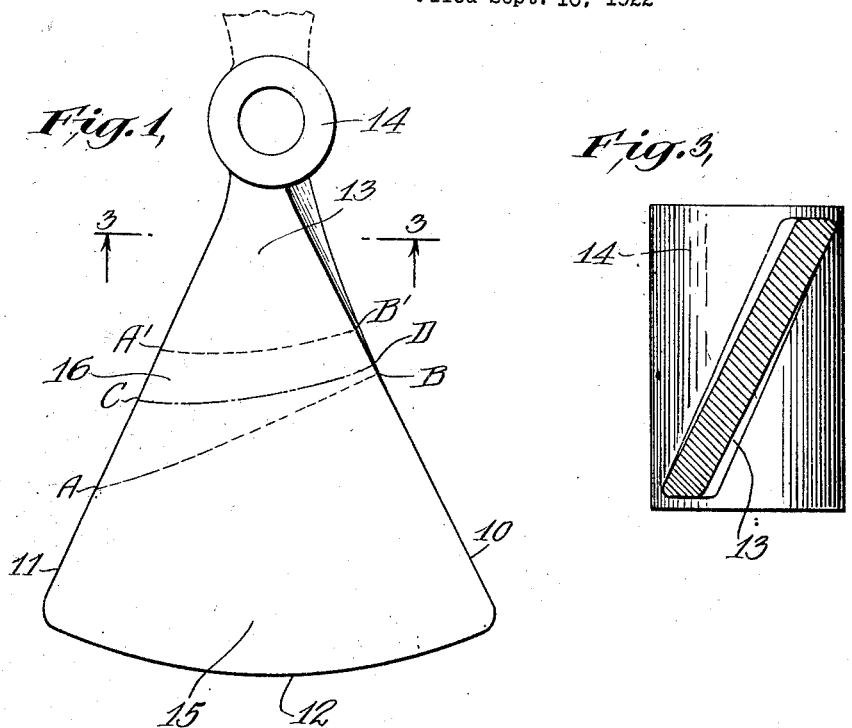
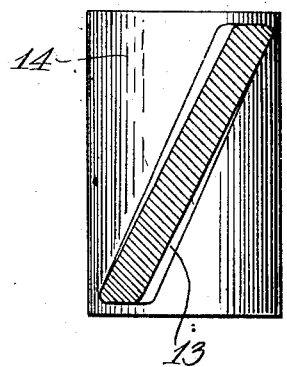
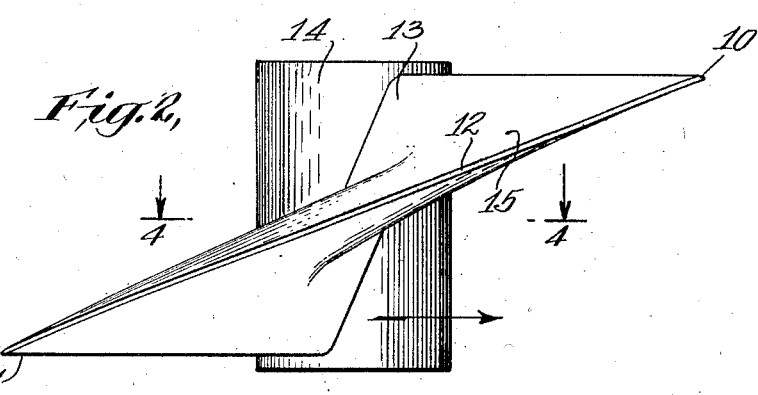
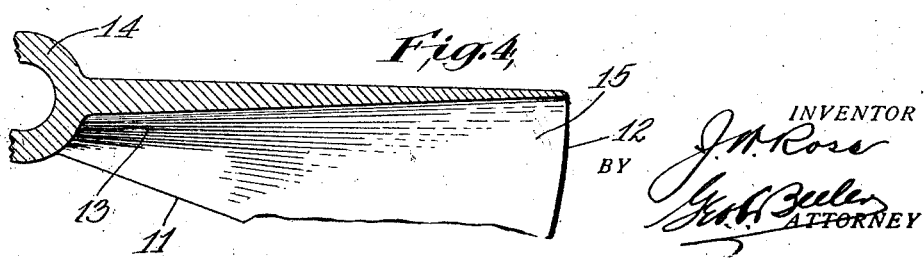
INVENTOR
J. W. Ross
BY
ATTORNEY Patented July 21, 1925.

1,546,554

UNITED STATES PATENT OFFICE.

JAY WILBUR ROSS, OF BROOKLYN, NEW YORK, ASSIGNOR TO THE ROSS PROPELLER CORPORATION, OF NEW YORK, N. Y., A CORPORATION OF NEW YORK.

SCREW PROPELLER.

Application filed September 16, 1922. Serial No. 588,518.

*To all whom it may concern:*

Be it known that I, JAY WILBUR ROSS, a citizen of the United States, residing at New York city, borough of Brooklyn, in the county of Kings and State of New York, have invented certain new and useful Improvements in Screw Propellers, of which the following is a specification.

My invention and improvement relates to the pitch and form of the screw propeller blade of which there may be any convenient number in the propeller.

The object of a propeller being to convert the rotating power into thrust in the direction of its axis, the best propeller is that which converts a certain rotary power into the greatest thrust or produces a certain thrust with the least rotating power,—under the conditions of propelling a vessel through the water.

As screw propellers are generally made the blades have a true screw or helical driving face with a uniform pitch radially from the hub to the tip and from the leading edge to the trailing edge, or they have slight modifications from this, and the back has a rounded surface, the curvature of which increases as the hub is approached. In all cases the blades have a comparatively low pitch angle at the tips which gradually increases toward the hub where it approaches close to a 90° angle.

My new and improved propeller embodies the essential principles of the screw with such modifications of the pitch and form of the blades as secure certain advantages and avoids certain evils.

By careful study and extensive experiments I have found that in the operation of a marine propeller, there is loss of power in rotation of the water as the pitch angle of the acting blade surfaces exceeds 45°. It is obvious that while this loss of power is relatively low on low pitch propellers it increases with the pitch and contributes to the inefficiency of high pitch propellers.

One of the objects, therefore, is to do away with this loss of power by making the inner blade surfaces, the surfaces adjacent to the hub, inactive wherever the pitch angle exceeds 45°, and thus the whole rotating power is expended on the outer blade surfaces, the surfaces adjacent to the tip, where the pitch angle is less than 45°.

While reference is made herein to a marine propeller or one used in water as a medium I wish it to be distinctly understood that it is my purpose not to be unnecessarily limited or restricted to water as a medium, for the same principles of advantage and novelty are as applicable to aerial navigation as in marine navigation.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a front elevation of a portion of a screw propeller indicating especially one blade.

Fig. 2 is an end elevation of the same on a larger scale.

Fig. 3 is a transverse section on the line 3—3 of Fig. 1.

Fig. 4 is a transverse section on the line 4—4 of Fig. 2, the scale being the same as in Fig. 1.

Figure 1 indicates a blade which in face view may be termed of triangular form, with its widest dimension along the tip or outer edge, but as to the form, as above intimated, the novel principles of my invention are not to be limited in all cases. In this figure the visible face of the blade may be thought of as the back face and the edge 10 is the leading edge, while the edge 11 is the trailing edge. True to the general type of screw propeller blades this blade is one in which the tip has a relatively low pitch angle, the tip edge 12 as indicated practically in Fig. 2 makes a small angle with respect to the plane perpendicular to the axis, while as a result of the spiral form of the blade the part 13 adjacent to the hub 14 forms an angle to the aforesaid plane approaching 90°. While in various types of propellers, designed according to speed of rotation and other conditions, there may be a considerable extent of variation of angle of the portion 13 from the plane of the axis of the hub, I do not specify what such angle shall be in any case in degrees, but for the highest efficiency the pitch of the hub portion of the blade must be enough lower than the pitch of the tip portion of the blade that the pitch speed of the blade adjacent to the hub will not exceed the speed of the vessel with relation to the water engaged by the propeller, and preferably the pitch speed of this portion of the propeller should be less than said speed of the vessel. It follows, therefore, that instead of the hub portion of the blade causing a turning or swirling of the water that comes in contact with it as in the usual type of screw propeller, this portion of the blade is idle with respect to such water, and hence is not retarded by it, but rather there is a tendency for the water passing it to give an impetus or turning moment to the blade additional to the power of the engine or other prime mover acting upon the propeller. It is well understood that in all practical operations of propellers the theoretical pitch speed of the propeller must necessarily be vastly greater than the actual speed of the vessel or the progressive speed of the propeller carried by the vessel, in order to insure the desired force or thrust. In order to carry out the feature of design of the blades just referred to to insure that the pitch speed of the hub portion of the blades shall not be greater than the speed of the vessel, it is practically necessary to make the pitch speed of the hub portion of the blade materially lower than the speed of the vessel in order to insure that, because of a considerable variation in the working conditions, the pitch speed of the hub portion shall not exceed that of the vessel and cause the paddle action at the hub. Consequently the power that is saved at this portion of the blade may be availed of for driving the tip portion of the blade more powerfully or at a higher speed than is or could be true with other types of propellers.

The propeller blade, depending upon the material or means for producing it, may have various characteristics as to thickness, taper, or surface contour. As screw propeller blades are ordinarily made the back surface is rounded and the degree of curvature increases from the tip inward toward the hub due to the gradual increase of thickness of the blade. This fact is also true of my propeller blade from the tip inward toward the hub but such rounding or curvature ceases substantially at the points where the pitch angles on this surface are 45°. This series of points due to the varying pitch angle on the curvature of the blade will assume or be in a diagonal direction across the width of the blade, and this series or row of points may be thought as being represented on the back surface by the line A—B, the inner boundary of the active or tip portion 15 of the blade. The form of the surface is then continued inward to the line A'—B' which is a curve on the back surface. The line A'—B' may be regarded as the outer boundary of the hub portion 13 of the blade, and inward toward the hub from said line the pitch speed of the blade becomes materially less than that of the tip portion 15 to the extent of being not greater and preferably less than the speed of the vessel with respect to the water passing the propeller. All points on the back surface of the blade between the lines A—B and A'—B' have a pitch angle of 45°. This portion 16 of the back surface obviously may have various widths radially or forms but serves as a place or portion of the entire surface in or along which the contour of the tip portion of the blade merges into the hub portion.

On the driving face of the blade the same conditions obtain as are specified above as to the back surface, but with the distinction that the line C—D, marking the inner boundary of the tip portion of the driving face and corresponding to the series of points where the pitch angles are 45°, follows the general curvature of the line A'—B', while the line bounding the outer edge of the hub portion of the driving face would be approximately similar in location to the line A'—B' on the other face. From the foregoing it follows that the sections of the hub portion of the blade transverse thereto, as illustrated in Fig. 3, are each in the form of a parallelogram or with the driving surface parallel to the back surface. By virtue of this parallelogram the objectionable high pitch angle of the hub portion 13 adjacent to the trailing edge of the back face is avoided.

In actual operation I have found that this form of propeller effects a material saving of power at a certain boat speed or it increases the boat speed when using the same amount of power.

I claim:

1. A screw propeller having a blade the portion of which adjacent to the hub is constructed to have a pitch speed less than the speed of the vessel relative to the water passing the propeller.

2. A screw propeller having a blade the portion of which adjacent to the hub is constructed to have a pitch speed less than the speed of the vessel relative to the medium passing the propeller, while the tip portion of the blade possesses a pitch speed greater than the speed of the vessel.

In testimony whereof I affix my signature.

JAY WILBUR ROSS.